(12) United States Patent
Shmaiser et al.

(10) Patent No.: US 10,703,094 B2
(45) Date of Patent: Jul. 7, 2020

(54) APPARATUS FOR THREADING AN INTERMEDIATE TRANSFER MEMBER OF A PRINTING SYSTEM

(71) Applicant: LANDA CORPORATION LTD., Rehovot (IL)

(72) Inventors: Aharon Shmaiser, Rishon LeZion (IL); Sagi Moskovich, Petach Tikva (IL); Zohar Goldenstein, Nes Ziona (IL); Matan Bar-On, Hod Hasharon (IL); Yiftach Katzir, Kibbutz Bet Guvrin (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 16/542,362

(22) Filed: Aug. 16, 2019

(65) Prior Publication Data
US 2020/0079076 A1    Mar. 12, 2020

Related U.S. Application Data

(63) Continuation of application No. 16/118,494, filed on Aug. 31, 2018, now Pat. No. 10,427,399, which is a
(Continued)

(30) Foreign Application Priority Data

Apr. 14, 2015    (GB) .................................. 1506314.2

(51) Int. Cl.
*B41J 2/005*     (2006.01)
*G03G 15/16*     (2006.01)
(Continued)

(52) U.S. Cl.
CPC ........... *B41J 2/0057* (2013.01); *B41J 11/007* (2013.01); *B41J 13/08* (2013.01); *B41J 15/048* (2013.01);
(Continued)

(58) Field of Classification Search
CPC ........ B41J 2/0057; B41J 15/16; B41J 11/007; B41J 13/08; B41J 15/048; B41J 2002/012; B65G 17/323; G03G 15/1615
See application file for complete search history.

(56) References Cited

U.S. PATENT DOCUMENTS 5,075,731 A    12/1991    Kamimura et al.
5,264,904 A    11/1993    Audi et al.
(Continued)

FOREIGN PATENT DOCUMENTS

CN    1121033 A    4/1996
CN    1212229 A    3/1999
(Continued)

OTHER PUBLICATIONS

JPH03248170A Machine Translation (by EPO & Google)—published Nov. 6, 1991; Fujitsu Ltd.
(Continued)

*Primary Examiner* — Ryan D Walsh
(74) *Attorney, Agent, or Firm* — Mark Van Dyke; Momentum IP Group

(57)    ABSTRACT

A printing system is described that has an intermediate transfer member in the form of a seamed endless belt for transporting an ink image from an image forming station, at which an ink image is deposited on the intermediate transfer member, to an impression station, where the ink image is transferred onto a printing substrate. The belt has along its edges formations of a greater thickness than the belt. The formations are received in channels to guide the belt and
(Continued)

maintain the belt under lateral tension. Two drive members are provided, each located within a respective one of the channels. The two drive members are connected for movement in synchronism with one another and each has a respective laterally projecting gripper shaped for form locking engagement with the formations on a leading end of a strip from which the intermediate transfer member is to be formed. Rotation of the drive members during installation of a new intermediate transfer member serves to thread the strip through the printing system by pulling the strip from its leading end.

20 Claims, 2 Drawing Sheets

Related U.S. Application Data continuation of application No. 15/564,198, filed as application No. PCT/IB2016/052120 on Apr. 14, 2016, now Pat. No. 10,226,920.

(51) Int. Cl.
| | |
|---|---|
| *B65G 17/32* | (2006.01) |
| *B41J 15/04* | (2006.01) |
| *B41J 13/08* | (2006.01) |
| *B41J 11/00* | (2006.01) |
| *B41J 15/16* | (2006.01) |
| *B41J 2/01* | (2006.01) |

(52) U.S. Cl.
CPC ............ *B41J 15/16* (2013.01); *B65G 17/323* (2013.01); *G03G 15/1615* (2013.01); *B41J 2002/012* (2013.01)

(56) References Cited

U.S. PATENT DOCUMENTS

| | | | |
|---|---|---|---|
| 5,333,771 A * | 8/1994 | Cesario | B65H 20/16 226/92 |
| 5,349,905 A | 9/1994 | Taylor et al. | |
| 5,642,141 A | 6/1997 | Hale et al. | |
| 5,889,534 A | 3/1999 | Johnson et al. | |
| 6,109,746 A | 8/2000 | Jeanmaire et al. | |
| 6,357,869 B1 | 3/2002 | Rasmussen et al. | |
| 6,377,772 B1 | 4/2002 | Chowdry et al. | |
| 6,811,840 B1 | 11/2004 | Cross | |
| 6,966,712 B2 | 11/2005 | Trelewicz et al. | |
| 6,983,692 B2 | 1/2006 | Beauchamp et al. | |
| 7,134,953 B2 | 11/2006 | Reinke | |
| 7,213,900 B2 | 5/2007 | Ebihara | |
| 7,265,819 B2 | 9/2007 | Raney | |
| 8,162,428 B2 | 4/2012 | Eun et al. | |
| 8,469,476 B2 | 6/2013 | Mandel et al. | |
| 8,867,097 B2 | 10/2014 | Mizuno | |
| 8,885,218 B2 | 11/2014 | Hirose | |
| 8,891,128 B2 | 11/2014 | Yamazaki | |
| 9,264,559 B2 | 2/2016 | Motoyanagi et al. | |
| 9,446,586 B2 | 9/2016 | Matos et al. | |
| 10,175,613 B2 | 1/2019 | Watanabe | |
| 10,427,399 B2 | 10/2019 | Shmaiser et al. | |
| 10,477,188 B2 | 11/2019 | Stiglic et al. | |
| 2002/0121220 A1 | 9/2002 | Lin | |
| 2003/0030686 A1 | 2/2003 | Abe et al. | |
| 2003/0043258 A1 | 3/2003 | Kerr et al. | |
| 2003/0063179 A1 | 4/2003 | Adachi | |
| 2003/0064317 A1 | 4/2003 | Bailey et al. | |
| 2004/0047666 A1 | 3/2004 | Imaizumi et al. | |
| 2004/0123761 A1 | 7/2004 | Szumla et al. | |
| 2004/0125188 A1 | 7/2004 | Szumla et al. | |
| 2004/0200369 A1 | 10/2004 | Brady | |
| 2005/0195235 A1 | 9/2005 | Kitao | |
| 2006/0004123 A1 | 1/2006 | Wu et al. | |
| 2006/0192827 A1 | 8/2006 | Takada et al. | |
| 2007/0123642 A1 | 5/2007 | Banning et al. | |
| 2008/0112912 A1 | 5/2008 | Springob et al. | |
| 2008/0213548 A1 | 9/2008 | Koganehira et al. | |
| 2010/0053292 A1 | 3/2010 | Thayer et al. | |
| 2010/0053293 A1 | 3/2010 | Thayer et al. | |
| 2011/0128300 A1 | 6/2011 | Gay et al. | |
| 2011/0150509 A1 | 6/2011 | Komiya | |
| 2011/0249090 A1 | 10/2011 | Moore et al. | |
| 2012/0314077 A1 | 12/2012 | Clavenna, II et al. | |
| 2013/0044188 A1 | 2/2013 | Nakamura et al. | |
| 2014/0168330 A1 | 6/2014 | Liu et al. | |
| 2014/0267777 A1 | 9/2014 | Le et al. | |
| 2015/0116408 A1 | 4/2015 | Armbruster et al. | |
| 2015/0195509 A1 | 7/2015 | Phipps | |
| 2015/0210065 A1 | 7/2015 | Kelly et al. | |
| 2015/0304531 A1 | 10/2015 | Rodriguez et al. | |
| 2016/0286462 A1 | 9/2016 | Gohite et al. | |
| 2017/0028688 A1 | 2/2017 | Dannhauser et al. | |
| 2017/0104887 A1 | 4/2017 | Nomura | |
| 2019/0256724 A1 | 8/2019 | Landa et al. | |

FOREIGN PATENT DOCUMENTS

| | | |
|---|---|---|
| CN | 101073937 A | 11/2007 |
| CN | 101344746 A | 1/2009 |
| CN | 201410787 Y | 2/2010 |
| CN | 102648095 A | 8/2012 |
| CN | 104618642 A | 5/2015 |
| GB | 748821 A | 5/1956 |
| GB | 1522175 A | 8/1978 |
| JP | S5578904 A | 6/1980 |
| JP | H03248170 A | 11/1991 |
| JP | H05192871 A | 8/1993 |
| JP | H06345284 A | 12/1994 |
| JP | H07186453 A | 7/1995 |
| JP | H09123432 A | 5/1997 |
| JP | 2000108334 A | 4/2000 |
| JP | 2002103598 A | 4/2002 |
| JP | 2003219271 A | 7/2003 |
| JP | 2004524190 A | 8/2004 |
| JP | 2005319593 A | 11/2005 |
| JP | 2006224583 A | 8/2006 |
| JP | 2006231666 A | 9/2006 |
| JP | 2007025246 A | 2/2007 |
| JP | 2008137239 A | 6/2008 |
| JP | 2008139877 A | 6/2008 |
| JP | 2008194997 A | 8/2008 |
| JP | 2008238674 A | 10/2008 |
| JP | 2008246990 A | 10/2008 |
| JP | 2009045851 A | 3/2009 |
| JP | 2010234599 A | 10/2010 |
| JP | 2010234681 A | 10/2010 |
| JP | 2010247381 A | 11/2010 |
| JP | 2010260287 A | 11/2010 |
| JP | 2010260302 A | 11/2010 |
| JP | 2011037070 A | 2/2011 |
| JP | 2011126031 A | 6/2011 |
| JP | 2012196787 A | 10/2012 |
| JP | 2014047005 A | 3/2014 |
| JP | 2014094827 A | 5/2014 |
| JP | 2016185688 A | 10/2016 |
| WO | WO-9912633 A1 | 3/1999 |
| WO | WO-2009134273 A1 | 11/2009 |
| WO | WO-2010073916 A1 | 7/2010 |

OTHER PUBLICATIONS

Clariant., "Ultrafine Pigment Dispersion for Design and Creative Materials: Hostafine Pigment Preparation" Jun. 19, 2008. Retrieved from the Internet: [URL: http://www.clariant.com/C125720D002B963C/4352D0BC052E90CEC1257479002707D9/$FILE/DP6208E_0608_FL_Hostafinefordesignandcreativematerials.pdf].

CN101073937A Machine Translation (by EPO and Google)—published Nov. 21, 2007; Werner Kaman Maschinen GMBH & [DE].

(56) References Cited

OTHER PUBLICATIONS

CN101344746A Machine Translation (by EPO and Google)—published Jan. 14, 2009; Ricoh KK [JP].
CN102648095A Machine Translation (by EPO and Google)—published Aug. 22, 2012; Mars Inc.
CN104618642 Machine Translation (by EPO and Google); published on May 13, 2015, Yulong Comp Comm Tech Shenzhen.
CN1121033A Machine Translation (by EPO and Google)—published Apr. 24, 1996; Kuehnle Manfred R [US].
CN1212229A Machine Translation (by EPO and Google)—published Mar. 31, 1999; Honta Industry Corp [JP].
CN201410787Y Machine Translation (by EPO and Google)—published Feb. 24, 2010; Zhejiang Chanx Wood Co Ltd.
Co-pending U.S. Appl. No. 16/432,934, filed Jun. 6, 2019.
Co-pending U.S. Appl. No. 16/433,970, filed Jun. 6, 2019.
Co-pending U.S. Appl. No. 16/512,915, filed Jul. 16, 2019.
Flexicon., "Bulk Handling Equipment and Systems: Carbon Black," 2018, 2 pages.
IP.com Search, 2019, 1 page.
JP2000108334A Machine Translation (by EPO and Google)—published Apr. 18, 2000; Brother Ind Ltd.
JP2003219271 Machine Translation (by EPO and Google); published on Jul. 31, 2003, Japan Broadcasting.
JP2004524190A Machine Translation (by EPO and Google)—published Aug. 12, 2004; Avery Dennison Corp.
JP2005319593 Machine Translation (by EPO and Google)—published Nov. 17, 2005, Jujo Paper Co Ltd.
JP2008137239A Machine Translation (by EPO and Google); published on Jun. 19, 2008, Kyocera Mita Corp.
JP2008246990 Machine Translation (by EPO and Google)—published Oct. 16, 2008, Jujo Paper Co Ltd.
JP2009045851A Machine Translation (by EPO and Google); published on Mar. 5, 2009, Fujifilm Corp.
JP2010234681A Machine Translation (by EPO and Google)—published Oct. 21, 2010; Riso Kagaku Corp.
JP2010247381A Machine Translation (by EPO and Google); published on Nov. 4, 2010, Ricoh Co Ltd.
JP2010260287 Machine Translation (by EPO and Google)—published Nov. 18, 2010, Canon KK.
JP2010260302A Machine Translation (by EPO and Google)—published Nov. 18, 2010; Riso Kagaku Corp.
JP2011126031A Machine Translation (by EPO and Google); published on Jun. 30, 2011, Kao Corp.
JPH06345284A Machine Translation (by EPO and Google); published on Dec. 20, 1994, Seiko Epson Corp.
JPH07186453A Machine Translation (by EPO and Google)—published Jul. 25, 1995; Toshiba Corp.
JPH09123432 Machine Translation (by EPO and Google)—published May 13, 1997, Mita Industrial Co Ltd.
JPS5578904A Machine Translation (by EPO and Google)—published Jun. 14, 1980; Yokoyama Haruo.
Marconi Studios, Virtual SET Real Time; http://www.marconistudios.il/pages/virtualset_en.php.
Montuori G.M., et al., "Geometrical Patterns for Diagrid Buildings: Exploring Alternative Design Strategies From the Structural Point of View," Engineering Structures, Jul. 2014, vol. 71, pp. 112-127.
Royal Television Society, The Flight of the Phoenix; https://rts.org.uk/article/flight-phoenix, Jan. 27, 2011.
Technical Information Lupasol Types, Sep. 2010, 10 pages.
The Engineering Toolbox., "Dynamic Viscosity of Common Liquids," 2018, 4 pages.
WO2010073916A1 Machine Translation (by EPO and Google)—published Jul. 1, 2010; Nihon Parkerizing [JP] et al.
Co-pending U.S. Appl. No. 16/590,397, filed Oct. 2, 2019.
Co-pending U.S. Appl. No. 16/629,020, filed Dec. 16, 2019.
Co-pending U.S. Appl. No. 16/677,732, filed Nov. 8, 2019.
Co-pending U.S. Appl. No. 16/714,756, filed Dec. 15, 2019.
Co-pending U.S. Appl. No. 16/737,859, filed Jan. 8, 2020.
Co-pending U.S. Appl. No. 16/784,208, filed Feb. 6, 2020.
JP2002103598A Machine Translation (by EPO and Google)—published Apr. 9, 2002; Olympus Optical Co.
JP2006224583A Machine Translation (by EPO and Google)—published Aug. 31, 2006; Konica Minolta Holdings Inc.
JP2006231666A Machine Translation (by EPO and Google)—published Sep. 7, 2006; Seiko Epson Corp.
JP2007025246A Machine Translation (by EPO and Google)—published Feb. 1, 2007; Seiko Epson Corp.
JP2008139877A Machine Translation (by EPO and Google)—published Jun. 19, 2008; Xerox Corp.
JP2008194997A Machine Translation (by EPO and Google)—published Aug. 28, 2008; Fuji Xerox Co Ltd.
JP2008238674A Machine Translation (by EPO and Google)—published Oct. 9, 2008; Brother Ind Ltd.
JP2010234599A Machine Translation (by EPO and Google)—published Oct. 21, 2010; Duplo Seiko Corp et al.
JP2011037070A Machine Translation (by EPO and Google)—published Feb. 24, 2011; Riso Kagaku Corp.
JP2012196787A Machine Translation (by EPO and Google)—published Oct. 18, 2012; Seiko Epson Corp.
JP2014047005A Machine Translation (by EPO and Google)—published Mar. 17, 2014; Ricoh Co Ltd.
JP2014094827A Machine Translation (by EPO and Google)—published May 22, 2014; Panasonic Corp.
JP2016185688A Machine Translation (by EPO and Google)—published Oct. 27, 2016; Hitachi Industry Equipment Systems Co Ltd.
JPH05192871A Machine Translation (by EPO and Google)—published Aug. 3, 1993; Minnesota Mining & Mfg.

* cited by examiner

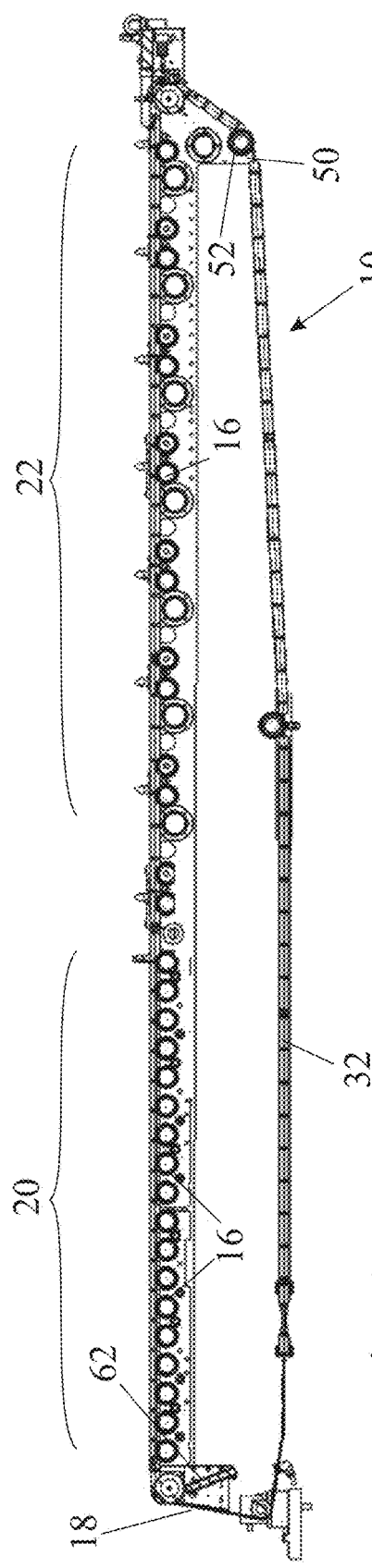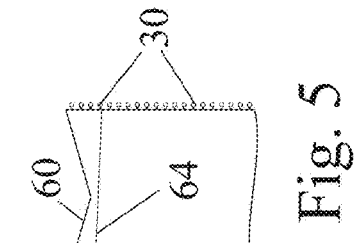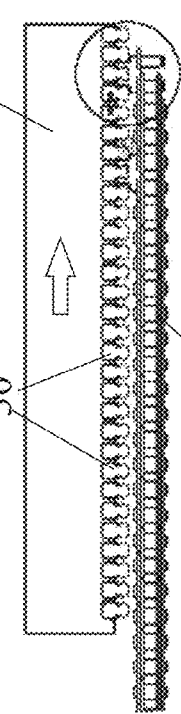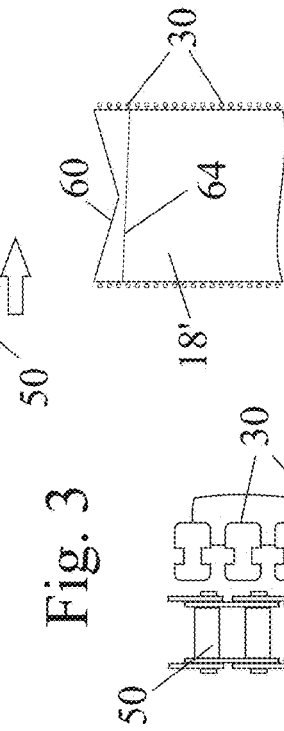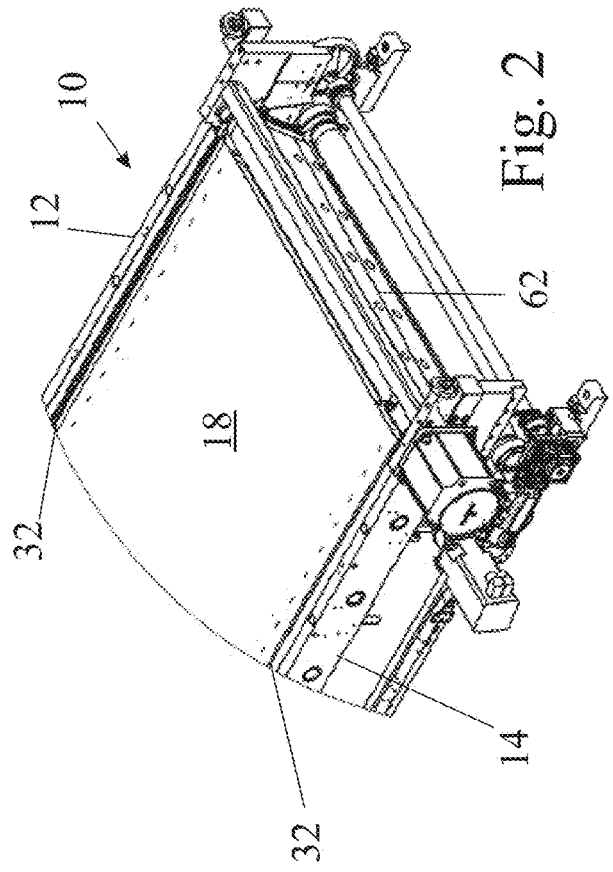

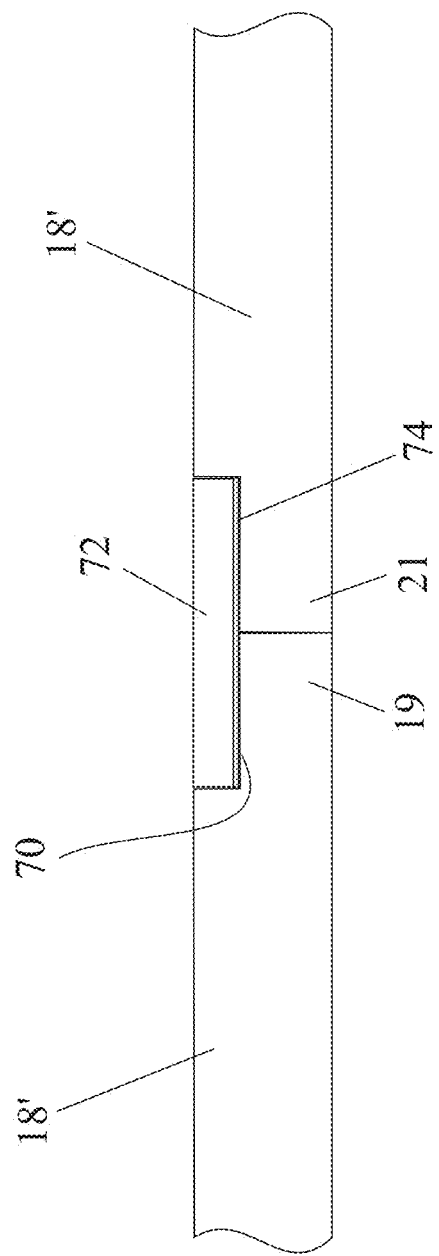

APPARATUS FOR THREADING AN INTERMEDIATE TRANSFER MEMBER OF A PRINTING SYSTEM

RELATED APPLICATION INFORMATION

The present application is a continuation of U.S. patent application Ser. No. 16/118,494 filed on Aug. 31, 2018. U.S. patent application Ser. No. 16/118,494 is a continuation of U.S. patent application Ser. No. 15/564,198, which is a 371 national stage entry of PCT/IB2016/052120 filed on Apr. 14, 2016. The contents of the aforesaid applications are incorporated herein by reference as if fully set forth herein.

FIELD

The present disclosure relates to a printing system in which liquid ink droplets are deposited at an image forming station onto a movable intermediate transfer member and transferred at an impression station from the intermediate transfer member onto a printing substrate. Specifically this disclosure pertains to an apparatus for threading the intermediate transfer member through the various stations of the printing system.

BACKGROUND

The present Applicant has previously disclosed a printing system and process wherein images made up of inks having an aqueous carrier are jetted onto a recirculating intermediate transfer member that transports them to an impression station where they are transferred to the desired printing substrate (e.g., paper, cardboard, plastic films etc.). As against inkjet printers, that deposit ink directly onto the printing substrate, such systems allow the distance between the surface of the intermediate transfer member and the inkjet print head to be maintained constant and reduces wetting of the substrate, as the inks may be dried while being transported by the intermediate transfer member before they are transferred to the substrate. Consequently, the final image quality on the substrate is less affected by the physical properties of the substrate and benefits from various other advantages as a result of the image remaining above the substrate surface. More details of such a system are disclosed in WO2013/132418, filed on Mar. 5, 2013 and incorporated herein by reference.

The present disclosure is concerned with an apparatus for assisting with the initial installation of the intermediate transfer member in such a printing system and with its replacement when the need arises without having to separate the various components of the printing system.

At the image forming station, the intermediate transfer member in such a printing system needs to pass through a narrow gap between the print heads and its own support and drive system, and it needs to be maintained both taut and at a fixed distance from the print heads. To achieve this, WO 2013/132418 describes in FIG. 11 how formations may be provided along the lateral edges of the intermediate transfer member that are received in guide channels having, for instance, a C-shaped cross section that is shown in FIG. 12 of the latter publication. The formations may be the teeth of two zip fastener halves, or any other type of "beads" that can properly move in the guide channels, that are attached to the respective lateral edges of the intermediate transfer member and their engagement in the guide channels serves both to constrain the path followed by the intermediate transfer member and to maintain it under lateral tension.

The intermediate transfer member is seamed once installed and starts life as a long strip, also termed a blanket in practice, but the latter term will not be used herein as it also common to refer to the installed intermediate transfer member as a blanket. The strip needs to be threaded through the various stations of the printing systems and, after it has been threaded around its entire path, its ends strip can be cut to the correct length, if necessary, and joined to one another to form a continuous loop. The ends of the strip can be attached to one another by soldering, gluing, taping (e.g., using Kapton® tape, RTV liquid adhesives or PTFE thermoplastic adhesives with a connective strip overlapping both edges of the strip), or any other method commonly known. Any method of joining the ends of the blanket strip to form an intermediate transfer member may cause a discontinuity, referred to herein as a seam.

The seam can be of different types. In particular, the edges may overlap one another or a patch may be applied to overlie the two ends. In either case, the seam may be subsequently processed, such as my grinding, to reduce its thickness.

To feed the strip into the printing system, it was proposed by the present Applicant in WO2013/136220 to provide entry points in the guide channels and to mount an external threading mechanism, shown in FIGS. 9 and 10 of the latter publication, for gripping the formations on the lateral edges of the strip and advancing its two lateral edges at the same rate into their respective guides. However, even with the aid of such a threading mechanism, it was found that the intermediate transfer member was difficult to install on account of buckling on meeting resistance or an obstruction.

It was also proposed in WO2013/136220 (see FIG. 13) to provide a loop of cable permanently housed in one or both of the tracks. The aim was to anchor the leading end of the replacement belt to the cable then to use the cable to feed the strip through the various tracks. During normal use, the cable(s) would remain stationary in the track(s) and only be rotated during installation of a new intermediate transfer member.

The use of cable loops was not found satisfactory and the present disclosure therefore aims to simplify the task of installing and replacing an intermediate transfer member in an indirect printing system.

SUMMARY

According to the present disclosure, there is provided a printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, the printing system further comprises two endless drive members, each located within a respective one of the channels, the two drive members being connected for movement in synchronism with one another and each having a respective laterally projecting gripper shaped for form locking engagement with the formations on a leading end of a strip from which the intermediate transfer member is to be formed, rotation of the drive members during installation of a new intermediate transfer member being operative to thread the strip through the printing system by pulling the strip from its leading end.

The threading mechanism in the present proposal differs from that disclosed in FIGS. 9 and 10 of WO2013/136220 in that the strip for forming the intermediate transfer member is pulled through the printing system by its leading end instead of being pushed from behind along its desired path. The strip is therefore maintained under longitudinal tension and thereby avoids buckling of the strip if the leading end of the strip should encounter resistance or an obstruction.

The present disclosure differs from the embodiment shown in FIG. 13 of WO2013/136220 in that it uses grippers that engage the formations on the strip. This can ensure that the imaginary line extending the two grippers lies exactly perpendicular to the longitudinal axis of the strip, to avoid any tendency for the strip to be pulled towards one side or the other. Furthermore, because the grippers are capable of engaging with the formations provided on the lateral edges of the leading end of the strip, the strips may to be cut from a continuous web without any special adaptation being required for connection of the strip to the drive members used to thread it through the printing system.

In some embodiments, the drive members have the form of chains or toothed belts in place of cables. As these are driven by toothed drive wheels or cogs, slipping can be avoided and this ensures that the strip is always pulled along at exactly the same rate on its two sides.

Despite engagement of the lateral edges of the leading end of the strip in the guide channels, the leading edge of the strip may still sag at the centreline of the strip and prove hard to introduce into some of the narrow gaps through which it has to be threaded.

To assist in this task, in some embodiments of the invention, the leading edge of the strip is cut at an angle and is not perpendicular to the lateral edges of the strip.

A severely inclined leading end would need to be trimmed after it has been threaded through the printing system to avoid increasing the length of the unusable seam region of the intermediate transfer member. To minimise the wastage caused by such trimming while retaining the advantage of smoother threading, it is convenient to form the leading edge with a V-shaped cut out with two sections inclined relative to the lateral edges of the strip instead of one extending across the entire width of the strip.

After threading of the intermediate transfer member, its ends need to be trimmed to the correct length and joined to one another to form a seam. The seam preferably extends at an angle that is slightly offset from the perpendicular to the lateral edge of the strip. This angle is so that the entire width of seam, which may not have the same thickness as the remainder intermediate transfer member, should not pass at the same time over the drive rollers of the intermediate transfer member and create an abrupt change in tension in the intermediate transfer member. The angle is chosen as a compromise between avoiding such changes in tension and increasing the length of the unusable seam region.

To assist in forming the seam between the ends of the strip after it has been threaded through the printing system, a support plate may be provided in the printing system for supporting ends of the strip that are to be cut and joined to one another, the support plate not contacting the intermediate transfer member subsequent to installation of the intermediate transfer member.

Alternatively, the leading end of the strip can be transiently attached to a removable leader. The leader can have lateral formations compatible with the grippers of the drive members and can be releasably attached to the leading end of the strip. While the removable leader may be shaped as above described for the leading end, it may alternatively or additionally be made of a material less prone to sagging than the intermediate transfer member being installed. The leader can be made of a material rigid enough to allow threading of the strip through narrow gaps without interfering with adjacent parts of the printing system, but flexible enough to bend within the lateral guide channels, were curved guide channels be present along the path followed by the intermediate transfer member. In the following, and unless otherwise clear from context, the term leading end interchangeably refer to the integral leading end of the strip being installed and to the removable leader transiently attached to this end.

When a removable leader is attached to the strip, the strip may have a predetermined length and its ends may be shaped to enable the belt to have substantially the same thickness at the seam as along the remainder of its length. This may be achieved by forming a respective rebate in the rear surface of each end to receive a tape having the same width as the combined widths of the two rebates and a thickness matching the depth of the rebates. In this way, the tape used to join the two ends of the strip is recessed into the strip instead of lying above it and therefore does not cause a thickening of the intermediated transfer member at its seam.

In accordance with a second aspect of the disclosure, there is provided a method of installing an intermediate transfer member in a printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, which method comprises providing an elongate strip of a length exceeding the circumference of the intermediate transfer member, connecting a leading end of the strip to two grippers projecting laterally from two drive members that are each disposed within a respective one of the two channels by engaging formations on a leading end of the strip with the two grippers, rotating the drive members in synchronism with one another to thread the leading end of the strip through the stations of the printing system, and joining the ends of the strip to one another to form an endless intermediate transfer member after the strip has been threaded through the printing system.

In an embodiment in which the strip has a separable leader and the ends of the strip are rebated, and joined to one another by adhering a tape within the rebates in the ends of the strip to form a seam while maintaining the uniformity of the thickness of the intermediate transfer member. By "rebated", it is meant that the thickness of the ends of the strip is reduced, such as by grinding, so as to define a recess for receiving the tape when the two ends of the strip are abutted against one another.

In accordance with a third aspect of the disclosure, there is provided a printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, the printing system further comprising two endless drive members, each located within a respective one of the channels, the two drive members being connected for movement in synchronism with one another and rotation of the drive members during installation of a new intermediate transfer member being operative to thread a strip from which the intermediate transfer member is to be formed through the printing system by pulling the strip from its leading end, wherein opposite ends of the strip are formed with rebates for receiving a joining tape to form a seam, and are joined at a seam while maintaining the thickness of the intermediate transfer member uniform throughout its length In accordance with a fourth aspect of the disclosure, there is provided a method of installing an intermediate transfer member in a printing system having an intermediate transfer member in the form of an endless belt for transporting an ink image from an image forming station, at which an ink image is deposited on the intermediate transfer member, to an impression station, where the ink image is transferred onto a printing substrate, which method comprises providing an elongate strip of predetermined length corresponding to the circumferential length of the intermediate transfer member, threading the strip through the printing system, providing rebates along the end edges, and joining the end edges to one another by means of tape that is recessed within the rebates and secured to the ends of the strip, so to form a seam having substantially the same thickness as the strip.

The end edges of the strip may be rebated prior to threading of the strip through the printing system and a leader may be releasably secured to one of the two rebated ends of the strip to assist in threading the strip through the printing system.

BRIEF DESCRIPTION OF THE DRAWINGS

The invention will now be described further, by way of example, with reference to the accompanying drawings, in which:

FIG. 1 is a section through a support system of an intermediate transfer member;

FIG. 2 is a perspective view of one end of the support system shown in FIG. 1;

FIG. 3 is a section through one of the guide channels of the intermediate transfer member with one of the drive members running alongside the formations on the lateral edges of the intermediate transfer member;

FIG. 4 is a detail of FIG. 3 drawn to an enlarged scale;

FIG. 5 shows the leading end of a strip that is threaded through a printing system to form an intermediate transfer member; and FIG. 6 shows the manner in which the ends of a strip may be joined at a seam while maintaining the thickness of the intermediate transfer member uniform throughout its length.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical components but may not be referenced in the description of all figures.

DETAILED DESCRIPTION OF THE DRAWINGS

An intermediate transfer member support system 10 shown in FIGS. 1 and 2 comprises two lateral frames 12 and 14, arranged one on each side of the intermediate transfer member 18, and various support, drive and tensioning rollers 16 extending transversely between the two frames 12 and 14 to constrain the intermediate transfer member to follow a closed loop and pass through the various stations of the printing system. The remainder of the printing system and more details of the intermediate transfer member support system are well documented in the prior art and need not therefore be repeated in the present context. Essentially, in the region designated 20 the intermediate transfer member passes beneath an image forming station where ink is deposited on the intermediate transfer member to form an image. The intermediate transfer member rotates clockwise as viewed to carry the ink image to the region designated 22, where the wet image is heated to evaporate the ink carrier and leave behind a tacky resin film. Along its lower run, the intermediate transfer member passes through one or more impression stations where it is pressed against a substrate, so that the tacky film separates from the intermediate transfer member and is transferred to the surface substrate.

The intermediate transfer member support system 10 is designed to ensure that the intermediate transfer member remains substantially flat and taut as it passes the regions 20 and 22 and as it approaches the nip of the impression stations. In order to achieve this objective, the edges of the intermediate transfer member 18 have formations 30 in the form of zipper teeth, shown in FIGS. 3 and 4, that have a greater thickness than the transfer member 18 and are received in C-shaped guide channels 32 secured to the lateral frames 12 and 14. The guide channels 32 are shown in FIG. 1 and their position in the support system is shown in FIG. 2. Further details of the formations 30 and the guide channels 32 are disclosed WO2013/132418 and are shown in FIGS. 11 and 12 of that publication. It is to be understood that the guide channels may have any alternative cross section shape, as long as the lateral formations and the guide channels are compatible and suitable to guide the intermediate transfer member and maintain it under lateral tension while the printing system is operating.

The intermediate transfer member 18 is installed by threading a strip 18' through the printing system and connecting its ends to one another by means of a seam, in order to form a seamed endless loop. The present disclosure is concerned with simplifying this task, which needs to be carried out, not only during manufacture, but from time to time during use as the intermediate transfer member is subjected to wear.

The installation of a new or replacement intermediate transfer member 18 is made difficult by the fact that its lateral formations 30 need to be introduced into the guide channels 32 and, as can be seen in FIG. 1, these need not be continuous. Because they maintain the intermediate transfer member under lateral tension, engagement of the formations 30 in the guide channels 32 creates drag and makes threading of the strip 18' from which the intermediate transfer member more difficult.

To mitigate this problem, in the disclosed embodiment, two endless drive members, in the form of chains 50 passing over sprockets 52 are provided alongside the edges of the intermediate transfer member 18, preferably within the enclosed cross section of the C-shaped channels 32. Reference to chains passing over sprockets is intended herein to include the equivalent of toothed belts passing over toothed pulleys. Each of the chains 50 has a respective laterally projecting gripper 54, most clearly shown in FIG. 4, that engages the formations 30 of the intermediate transfer member strip 18' at its leading end in a form locking manner. After the gripper 54 has engaged the formations on the leading edge of the strip 18', the two endless chains 50 are driven to pull the strip 18' by its leading end, in the direction shown by the arrows in FIG. 3, through the various stations of the printing system. To ensure that the two chains 50 move in synchronism, two of their drive sprockets 52 are mounted on a common axle that is connected either to a crank for manual operation, or to a suitable motor if threading is automated.

The intermediate transfer member 18 may in some locations have to be threaded through a gap that is as narrow as 2 mm, while its width may typically be about 1,000 mm. Sagging of the leading edge of the strip 18' being threaded through the printing system can therefore cause a problem. This is mitigated by forming a V-shaped cut-out 60 in the leading edge of the strip in the manner shown in FIG. 5.

Once the strip has been pulled around the entire printing system, and its leading end comes round to the end of the support system shown in FIG. 2, the opposite ends of the strip are laid over a support plate 62 and joined to one another to form a seam, which may, as shown in FIG. 5, extend along an inclined line 64. After the seam has been formed, a tension roller is extended to maintain the intermediate transfer member under the desired longitudinal tension and space it from the grippers 54 that remain stationary during operation of the printing system.

To form the seam, the two ends of the strip 18' may be laid one over the other on the support plate 62 and cut along the inclined line 64. While retained on the support plate 62 with the cut edges in abutting relation, an adhesive tape may be laid over the two ends to create the desired join. Such a method of forming the two ends results in a seam having an increased thickness and in order that it should not create a sudden change in tension as it passes over drive rollers or through an impression station, the cut line 64 may be inclined in the manner illustrated in FIG. 5.

It is alternatively possible to form a seam without increasing the thickness of the intermediate transfer member and this is shown in FIG. 6. In this case, the strip 18' is made to a predetermined length and is attached to a separable leader at its leading end. The leading 19 and trailing 21 ends of the strip 18' proper, would be ground down to form rebates 70 for receiving a tape 75 that is as wide as the two rebates 72. The tape 72 is secured to the two ends of the strip 18' by a layer 74 of adhesive.

In an embodiment where the thickness of the strip 18' is about 550 μm, the rebates in the ends of the strip may have a depth of 200 μm. The rebates can then accommodate a tape having a thickness of about 150 μm leaving 50 μm for the thickness of the adhesive layer 74.

The separable leader should be made of a flexible material so that it may follow the path of the intermediate transfer member but it may be made of a stiffer material than the strip 18' so as to have less tendency to sag. The leader may, as shown in FIG. 5, have a V-shaped leading edge and it should have formations that are continuous with the formations on the sides of the strip 18'.

It is understood that in addition to the image forming station and the impression station above-mentioned, a printing system may further comprise a treatment station and/or a cleaning station to respectively treat and/or clean the intermediate transfer member, a drying station to evaporate liquid carrier out of the ink image, a cooling or a heating station to modify the temperature of the intermediate transfer member along its path, a finishing station for further processing the printed substrate, and so on. All such stations need not be considered in detail in the present context.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the present disclosure has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the appended claims and any change which come within their meaning and range of equivalency.

In the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise.

Unless otherwise stated, the use of the expression "and/or" between the last two members of a list of options for selection indicates that a selection of one or more of the listed options is appropriate and may be made.

Unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended.

To the extent necessary to understand or complete the present disclosure, all publications, patents, and patent applications mentioned herein, including in particular the applications of the Applicant, are expressly incorporated by reference in their entirety by reference as is fully set forth herein.

The invention claimed is:

1. A kit for use in a printing system, the kit comprising:
 a. an intermediate transfer member (ITM) having leading and trailing ends and
 b. a separable leader that is releasably attachable to the leading end of the ITM to longitudinally extend from the ITM at the leading end thereof, wherein:
  i. the ITM comprises an endless belt formed by threading an elongate strip through the printing system, the elongate strip comprising ITM-disposed lateral-formations provided along the edges of the strip and adapted to be engaged to guide channels of the printing system so as to guide the strip through the guide channels; and
  ii. the separable leader has leader-disposed lateral-formations disposed on opposite lateral sides of the leader; and
  iii. the separable leader is configured to thread the ITM through the guide channels when attached to the leading edge of the ITM, and is releasable from the ITM leading edge after threading and while the ITM-disposed lateral formations remain engaged to the guide channels.

2. The kit of claim 1 wherein the formations of the leader-disposed lateral-formations have the form of zipper teeth.

3. The kit of claim 2 wherein the formations of the ITM-disposed lateral-formations have the form of zipper teeth.

4. The kit of claim 1 wherein the leading edge of the ITM is straight and oriented in the lateral direction and wherein the separable leader is V-shaped on its leading end.

5. The kit of claim 4 wherein a trailing end of the separable leader is straight and oriented in the lateral direction.

6. The kit of claim 1 wherein both a trailing end of the separable leader and the leading end of the elongate strip are straight and oriented in the lateral direction.

7. The kit of claim 1 wherein leader and the ITM are constructed of different materials.

8. The kit of claim 1 wherein the leader and the ITM are respectively constructed of first and second materials, the first material having a greater resilience than the second material.

9. The kit of claim 1, wherein ends of the elongate strip at the leading and trailing edges of the ITM are rebated.

10. The kit of claim 1, wherein the elongate strip at the leading and trailing edges of the ITM are formed with rebates for receiving a joining tape to form a seam, and are configured to be joined at a seam while maintaining the thickness of the intermediate transfer member uniform throughout the length of the seam.

11. An installation method for a printing system comprising guide channels, the method comprising:
  a. releasably attaching a separable leader to the leading edge of an intermediate transfer member (ITM) to longitudinally extend therefrom, the separable leader having leader-disposed lateral formations on opposite lateral sides of the leader, the ITM comprising an elongate strip and ITM-disposed lateral formations provided along the edges of the strip and adapted to be engaged to the guide channels of the printing system so as to guide the strip therethrough;
  b. using the attached separable leader to pull the endless strip of the ITM from its leading end so as to thread the ITM through the guide channels of the printing system; and
  c. while the ITM-disposed lateral formations remain engaged to the guide channels, releasing the separable leader from the ITM.

12. The method of claim 11 wherein the printing system further comprises two endless drive members, each located within a respective one of the channels, the two drive members being connected for movement in synchronism with one another and each having a respective laterally projecting gripper shaped for form locking engagement with the leader-disposal lateral formations of the separable leader.

13. The method of claim 12 wherein the threading is performed by rotation of the drive members so as to thread the strip through the printing system by pulling attached separable leader.

14. The method of claim 11 further comprising: after releasing the leader from the remainder of the strip, joining the end of the elongate strip to each other to form an endless belt therefrom.

15. The method of claim 11 wherein the ends of the strip are rebated and wherein, after releasing the leader from the remainder of the strip, the ends of the strip are joined to one another by adhering a tape within the rebates in the ends of the strip to form a seam while maintaining the uniformity of the thickness of the intermediate transfer member.

16. The method of claim 11 wherein the formations of the leader-disposed lateral-formations have the form of zipper teeth.

17. The method of claim 16 wherein the formations of the ITM-disposed lateral-formations have the form of zipper teeth.

18. The method of claim 11 wherein the leading edge of the ITM is straight and oriented in the lateral direction and wherein the separable leader is V-shaped on its leading end.

19. The method of claim 11 wherein both a trailing end of the separable leader and the leading end of the elongate strip are straight and oriented in the lateral direction.

20. The method of claim 11 wherein the leader and the ITM are respectively constructed of first and second materials, the first material having a greater resilience than the second material.

* * * * *